(12) United States Patent
Almirante

(10) Patent No.: US 6,698,272 B1
(45) Date of Patent: Mar. 2, 2004

(54) DEVICE FOR INDICATING EXPOSURE TO AN IMPACT, ADVERSE TEMPERATURE AND/OR HUMIDITY

(75) Inventor: Joseph Y Almirante, Quezon (PH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/334,552

(22) Filed: Dec. 30, 2002

(51) Int. Cl.⁷ .................................. G01P 15/00
(52) U.S. Cl. .................... 73/12.01; 73/11.01; 73/11.04; 73/862.381
(58) Field of Search .............. 73/12.01, 11.01, 73/11.04, 862.381

(56) References Cited

U.S. PATENT DOCUMENTS

| | | |
|---|---|---|
| 3,877,411 A | 4/1975 | MacDonald |
| 3,952,746 A | 4/1976 | Summers |
| 3,953,659 A | 4/1976 | Truitt |
| 4,098,120 A | 7/1978 | Manske |
| 4,361,106 A | 11/1982 | Elkof |
| 4,470,302 A | 9/1984 | Carte |
| 4,931,420 A | 6/1990 | Asano et al. |
| 5,325,721 A | 7/1994 | Pendergrass, Jr. |
| 5,551,279 A | 9/1996 | Quick |
| 5,622,137 A | 4/1997 | Lupton, Jr. et al. |
| 5,875,892 A | 3/1999 | Martin et al. |
| 2001/0046451 A1 | 11/2001 | Patel |
| 2002/0000184 A1 | 1/2002 | Paton et al. |

FOREIGN PATENT DOCUMENTS

| | | |
|---|---|---|
| JP | 11-326364 A | 11/1999 |
| JP | 2001-099854 A | 4/2001 |

*Primary Examiner*—Edward Lefkowitz
*Assistant Examiner*—Alandra N. Ellington
(74) *Attorney, Agent, or Firm*—T. Rao Coca; Anthony V. S. England

(57) ABSTRACT

An impact sensor for indicating exposure of an electronic equipment to a predetermined impact force is described. The impact sensor has a hollow case, a mass within the case, and a number of wire filaments supporting the mass within the case. Exposure of the sensor to the predetermined impact force results in a force acting on the mass sufficient to cause at least one of the filaments to break. The breaking of at least one of the filaments indicates to a repairer that the electronic equipment has been exposed to the predetermined impact force.

45 Claims, 6 Drawing Sheets

DEVICE FOR INDICATING EXPOSURE TO AN IMPACT, ADVERSE TEMPERATURE AND/OR HUMIDITY

TECHNICAL FIELD

The present invention relates to a device for indicating exposure to an impact, adverse temperature and/or humidity particularly, but not exclusively, useful for portable electronic equipment such as laptop computers, digital cameras and audio/visual devices.

BACKGROUND OF THE INVENTION

Portable electronic equipment such as laptop computers, digital cameras and audio/visual equipment include sensitive electronic components. These equipment are usually covered by a manufacturer's warranty where the manufacturer will repair or replace the product in the event of a defect (eg. faulty workmanship or faulty components), for a limited period after purchase. While such equipment are usually designed to withstand minor bumps and minor variations in temperature and humidity, they are not designed for and should not be exposed to impacts (eg. dropping a device onto the ground or table) and adverse temperature and humidity (eg. exposing the device to direct sunlight, snow, rain, hot/cold/humid environments), which may damage the product. Manufacturers' warranties do not cover damage to these devices when exposed to any of such adverse conditions.

Often, devices damaged by exposure to adverse conditions are sent back to the manufacturer for repair under warranty. The customers may claim that their equipment was not exposed to any adverse condition. Apart from possible physical defects on the device resulting from an impact, there is presently no method for determining whether the product was exposed to any adverse condition. Currently, the manufacturers of many portable and mobile devices are not employing any means of determining exposure to such adverse conditions.

It would thus be desirable to provide a device which can reliably indicate to a repairer whether the faulty device has been exposed to any of such adverse conditions, in order to dispute a claim for warranty repair and avoid the associated costs.

There have been numerous attempts at providing devices for indicating exposure to an impact, adverse temperature or humidity, or combinations thereof, for various specific applications.

An impact sensor is disclosed in JP 2001-099854 (Akebono Brake Ind Co Ltd). This publication provides a device which can detect and display an impact such as a fall. In this device, a spherical shell which contains a coloured liquid is movably contained within an outer case which is attached to a portable electronic device. When the outer case is exposed to an impact, the shell is designed to break to spill the coloured liquid inside the outer case, giving a visual indication that the electronic device has been dropped.

Another impact sensor is disclosed in JP 11-326364 (Matsushita Electric Works Ltd). This publication provides a device having a body, the inside of which is partitioned into upper and lower housing spaces separated by a partition plate. Inside the upper housing space, a metal sphere is displaceably supported by three springs in all planar directions parallel to the partition plate. Inside the lower housing space, a printed-circuit board on which circuit components are mounted is located. A detecting coil mounted on the printed-circuit board is arranged under the metal sphere when the metal sphere is in a rest position (no shock force state). High-frequency magnetic fluxes are then generated from the detecting coil. Since an eddy-current loss generated on the surface of the metal sphere changes according to the displacement of the metal sphere, an impact can be detected.

Another impact sensor is disclosed in U.S. Pat. No. 5,551,279 (Quick). This US patent provides an impact gauge for determining the cumulative impact energy along a single axis. The device includes a housing having an elongated chamber with a pair of bendable members cantilevered into the chamber. An impacting member is positioned in the chamber with the impact member having sufficient mass so that when the housing is subjected to an impact, the inertia of the impacting member is sufficient to permanently bend the bendable member. One can then measure the degree of bend of the bendable member which can be correlated with impacts of measured strength to determine the accumulated impact energy absorbed by the impact gauge.

Another impact sensor is disclosed in U.S. Pat. No. 4,470,302 (Carte). This US patent provides an indicating shipping accelerometer having a transparent tube within which an inertial mass moves relative to a scale affixed to the transparent tube. The movement of the mass gives an indication of the maximum shock incurred in either direction of the tube's longitudinal axis. Springs on either side of the inertial mass maintain the inertial mass in its initial position.

Another impact sensor is disclosed in U.S. Pat. Pat. 4,361,106 (Eklof). This US patent provides a device for providing a non-resettable visual indication of a shock above a predetermined value which is sustained by an object carrying the device. The device includes a transparent dome-like housing having a chamber, and an indicating body within the chamber. Prior to being subjected to a force above the predetermined value, the indicating body is maintained in a first position and when subjected to a force above the predetermined value is irreversibly released to a second position.

A temperature sensor is disclosed in U.S. Pat. No. 5,622,137 (assigned to Trans World Services). This US patent provides a disposable temperature sensor comprising a rigid substrate having a coloured patch covered by a thermochromic material which obscures the colored patch. The thermochromic material, which has a color which completely obscures the underlying colored patch, is selected to have a melting or solidus point such that when the thermochromic material is exposed to a predetermined temperature, the thermochromic material permanently changes to a relatively transparent color whereby the colored patch on the substrate is rendered visible through the thermochromic material. When fitted to a device, the sensor gives a visual indication that the device has been exposed to a predetermined temperature.

Another temperature sensor is disclosed in U.S. Pat. No. 5,325,721 (assigned to Minnesota Mining and Manufacturing Company). This US patent discloses a device for selectively indicating strain, which can also be used to determine exposure of an article to a given low temperature. The device comprises a layer of polymeric binder that is stiff below a preselected stiffening temperature. Distributed in or adjacent to the binder layer are microcapsules containing an indicating means. When the binder is stiff, minor flexure of the device causes rupture of the microcapsules and releases the indicating means. The device has a non-stiff state above the stiffening temperature such that a given strain applied to the binder layer in the non-stiff state will not release the indicating means. The device also has a stiff state below the stiffening temperature such that the same given strain applied to the binder layer in the stiff state will release the indicating means. The microcapsules can be made of a thermoplastic material such that the integrity of the shell capsules is thermally compromised at a predetermined temperature above the stiffening temperature, whereby heating of the device also releases the indicating means. Also, the device can further comprise a self-activating means for applying strain to the binder layer, such that when the temperature of the device is below the stiffening temperature, the self-activating means imparts sufficient strain so that the microcapsules are ruptured. The means for applying strain can comprise two materials having different coefficients of thermal expansion, such that the device flexes when the device experiences a change in temperature over a predetermined range. Alternatively, the means for applying strain is a bimetallic strip in intimate contact with the binder layer.

Another temperature sensor is disclosed in U.S. Pat. No. 4,931,420 (assigned to Mitsui Toatsu Chemicals, Inc.). This US patent discloses a temperature history indicator for goods which must be stored at a certain temperature or lower. When the storage temperature of such goods rises higher than the certain temperature over a non-permissible time period, this fact can be visibly shown by development or change of color caused by chemical matters in the indicator.

Another temperature sensor is disclosed in U.S. Pat. No. 3,877,411 (assigned to Railtech Ltd). This patent discloses a temperature indicator bolt having a shallow depression formed in the bolt head. A wafer type indicator element is retained in the shallow depression. The indicator element is impregnated with a chemical substance having indicating properties responsive to the predetermined temperature, such that the color of the substance will change and remain changed when the bolt is subjected to the predetermined temperature.

Another temperature sensor is disclosed in U.S. Pat. No. 2001/0046451 (Patel). This reference discloses a device for detecting temperature exposure of an article below a threshold temperature including an indicator which changes color when the article is exposed to a temperature below the threshold temperature.

A humidity sensor is disclosed in U.S. Pat. No. 5,875,892 (assigned to Humidial Corporation). This US patent discloses a packaging container having a humidity indicator system. The humidity indicator system includes a humidity indicator element, a humidity comparison element and a securing system for securing the humidity indicator element to the packaging container. The humidity indicator element is formed from a hydrophilic blotter substrate onto which is placed a humidity indicator solution which is sensitive to humidity and which readily discloses the level of humidity in the air surrounding the indicator element by changing its color depending on the level of humidity.

Another humidity sensor is disclosed in U.S. Pat. No. 2002/0000184 (Paton and Mani). This US Patent provides an elapsed time indicator for controlled environments. Exposure time is determined by a device which is sensitive to an environmental substance in a controlled environment. Embodiments include a humidity sensitive timer treated with a cobalt salt which changes colors after a certain exposure time within the controlled environment. Elapsed time is measured by exposing the timer to a humidity controlled environment and monitoring the timer for a change in color.

Another humidity sensor is disclosed in U.S. Pat. No. 4,098,120 (assigned to Minnesota Mining and Manufacturing Company). This US patent provides a humidity indicating device suitable for visibly indicating exposure to a selected humidity level or for indicating a humidity-time history. The device comprises in combination a deliquescent compound, a liquid absorbent wick, and an indicating means. The change in properties of deliquescent compounds are employed to indicate a particular humidity level or a humidity-time history.

Another humidity sensor is disclosed in U.S. Pat. No. 3,952,746 (Summers). This US patent provides a humidity indicator for a diaper including a moisture impervious outer sheet and a moisture absorbent inner sheet. A transparent opening is formed in the outer sheet either for viewing a moisture indicator strip behind the outer sheet or for exposing the moisture indicator strip on the outside of the outer sheet to communication with the moisture in the absorbent inner sheet.

OBJECT OF THE INVENTION

It is the object of the present invention to provide an inexpensive, unresettable, miniature sensing and indicator device for attachment to mobile and portable devices which will allow a repairer to determine whether a device has been exposed to at least one of mechanical impact, temperature or humidity beyond its design, which will help manufacturers detect fraudulent warranty claims.

SUMMARY OF THE INVENTION

In one form, there is provided an impact sensor for indicating exposure of an electronic equipment to a predetermined impact force. The impact sensor has a hollow case, a mass within the case, and a number of wire filaments supporting the mass within the case. Exposure of the sensor to the predetermined impact force results in a force acting on the mass sufficient to cause at least one of the filaments to break. The breaking of at least one of the filaments indicates to a repairer that the electronic equipment has been exposed to the predetermined impact force.

In another form, there is provided a temperature sensor for indicating exposure of an electronic equipment to a predetermined upper and/or lower threshold temperature. The temperature sensor has a base and a snap action bimetallic strip which bends and snaps into place when exposed to a change in temperature. The first end of the strip is fixed to the base such that the second end thereof can move along the base with the change in temperature. Two wire filaments are attached to opposite sides of the second end of the strip. The other end of each filament is attached to the base. When the sensor is exposed to the predetermined upper or lower threshold temperature, the strip bends sufficiently to cause at least one the filaments to break. The breaking of at least one the filaments provides an indication of the exposure of the electronic equipment to the predetermined upper or lower threshold temperature.

In addition to the snap action bimetallic strip, the temperature sensor includes visual indicators which show the occurrence of exposure to an upper or lower threshold temperature. Exposure to the upper threshold is indicated by a change in color of a thermochromic chemical. Exposure to the lower threshold is indicated by a colored liquid in a capillary tube.

In another form, there is provided a humidity sensor for indicating exposure of an electronic equipment to a predetermined humidity level. The humidity sensor has a base and a plate mounted on the base which expands when exposed to moisture. A wire filament is attached between the base and a top portion of the plate. Exposure of the sensor to the predetermined humidity level results in expansion of the plate sufficient to cause the filament to break. The breaking of the filament thus indicates exposure of the electronic equipment to the predetermined humidity level.

BRIEF DESCRIPTION OF THE DRAWINGS

Preferred forms of the present invention will now be described, by way of examples only, with reference to the accompanying drawings wherein.

DETAILED DESCRIPTION OF THE PREFERRED EMBODIMENTS

Impact Sensor

Figure 1:
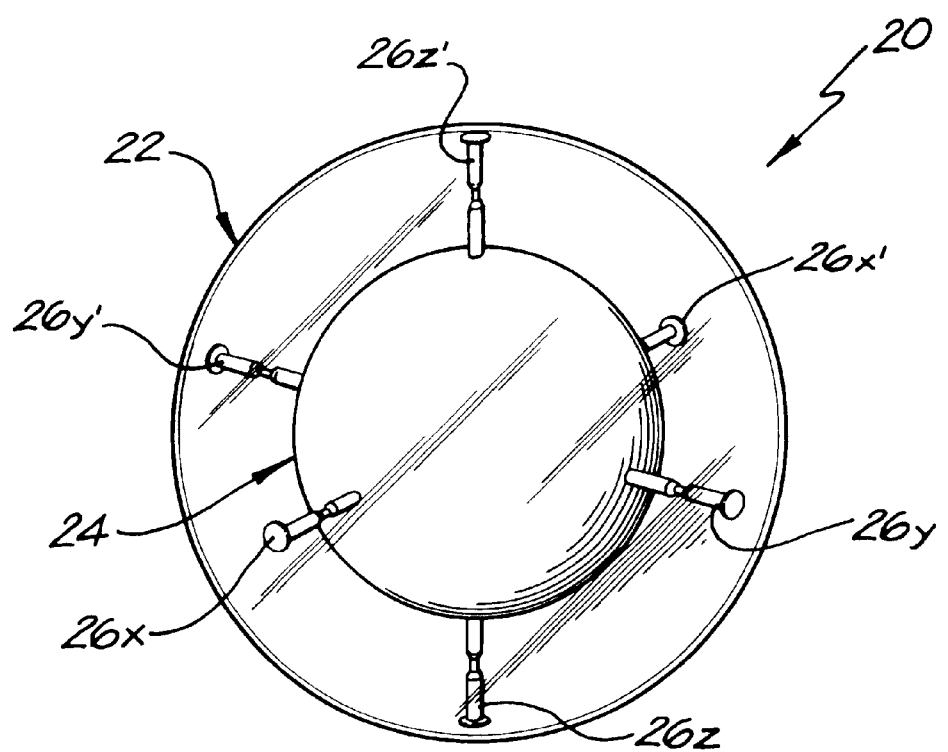
FIG. 1 is an impact sensor module.
Figure 2:
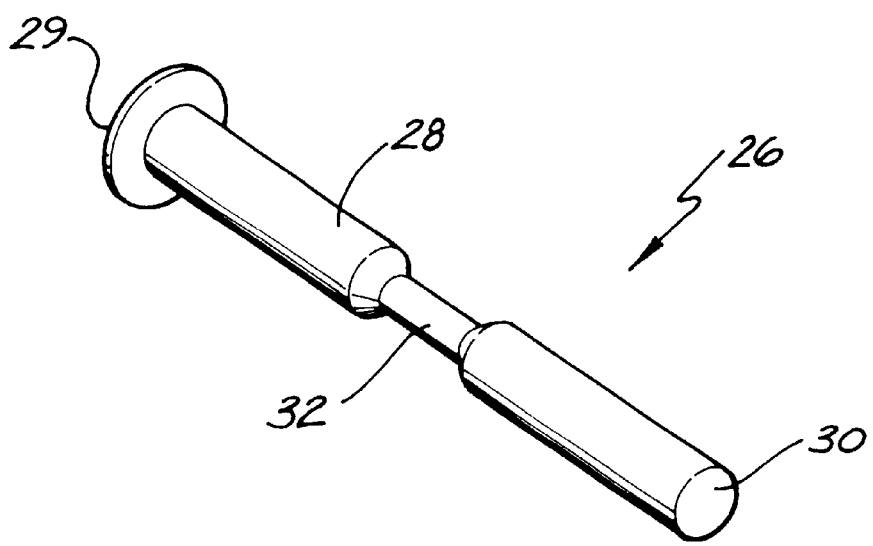
FIG. 2 is an enlarged diagram of a conductive filament for the impact sensor of FIG. 1.

FIG. 1 shows an impact sensor module 20. The sensor 20 includes a clear hollow spherical case 22, a solid ball 24 within the case 22, and three sets of opposing wire filaments 26 (26x, 26x', 26y, 26y', 26z, 26z') supporting the ball 24 in the middle of the case 22. Each filament 26 (see FIG. 2) comprises an elongated shaft 28 having a first end 29 and a second end 30. The elongated shaft 28 also has a reduced diameter portion 32 at a mid-section thereof. Referring back to FIG. 1, the first end 29 of each filament 26 is attached to the internal surface of the case 22 and the second end 30 is attached to the ball 24. As shown, filaments 26x, 26x' on opposite sides of the ball 24 support the ball 24 in the "x" direction, filaments 26y, 26y' support the ball 24 in the "y" direction and filaments 26z, 26z' support the ball 24 in the "z" direction. Air is evacuated from the case 22 such that the ball 24 is in a vacuum.

The case 22 is made of high impact crystal or hard plastic and is non-ferromagnetic and non-conductive. The ball 24 is a solid sphere made of non ferromagnetic, conductive material such as aluminium (density of 2.702 g/cm3) or lead (density of 11.35g g/cm3). The ball 24 is approximately 1.5 mm in diameter and has a mass of approximately 0.005 grams. The wire filaments 26 are made from non-corrosive, non-ferromagnetic, conductive material such as pure aluminium or low tensile strength metal or alloy. Each wire filament 26 has a diameter of approximately 0.5 mm, a cross sectional area of about 0.2 mm$^2$ and a tensile strength of approximately 38000 PSI or 262 N/m$^2$ at the reduced diameter portion 32.

The impact sensor 20 is typically attached to a portable electronic device, by attaching the case 22 to an internal portion of the device (eg. inner surface of device casing) or to a circuit board of the device. If the electronic device is exposed to an impact force, such as when dropped, the force of the impact results in a force F acting on the ball 24 (which has a mass m) where F=ma. The filaments 26 have a cross sectional area A and a tensile strength T at the reduced diameter portion 32. The filaments 26 are designed to break at the reduced diameter portion 32 at a certain resultant (threshold) force F=T*A. The breaking of one or more of the filaments 26 at the threshold force F' will indicate that the sensor 20, and thus the device to which it is attached to, was exposed to at least the predetermined impact force. This can be determined visually, by inspecting each of the filaments 26.

Figure 3:
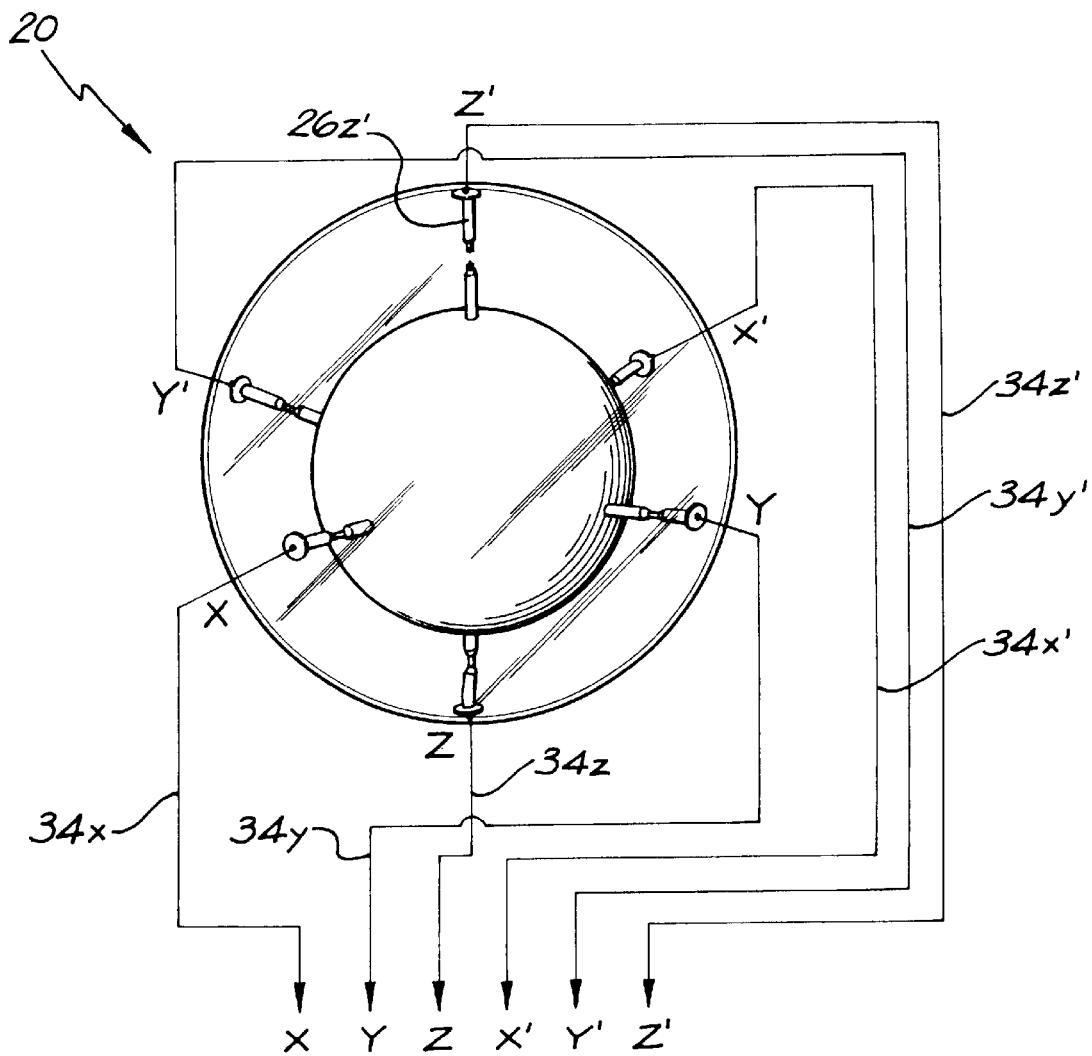
FIG. 3 is a diagram showing testing for the occurrence of an impact in the impact sensor module of FIG. 1.
Figure 4:
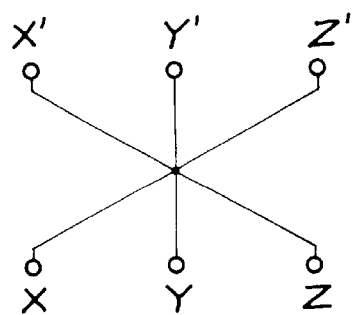
FIG. 4 is a logical circuit diagram for the impact sensor module of FIG. 1.

Determining whether one or more of the filaments 26 is broken can also be performed electrically. FIG. 3 is a diagram showing electrical testing for the occurrence of an impact in the impact sensor 20. As shown in FIG. 3, six external wires 34 (34x, 34x', 34y, 34y', 34z, 34z') are respectively connected to the first ends 29 of the filaments 26 (26x, 26x', 26y, 26y', 26z, 26z'). The other ends of the wires 34 are indicated as points X, X', Y, Y', Z, Z', respectively. As the filaments 26 and ball 24 are electrically conductive, the circuit between any two of the points X, X', Y, Y', Z, Z', will be broken if one or both of their corresponding filament 26x, 26x', 26y, 26y', 26z, 26z' is broken. FIG. 4 is a logical circuit diagram for the impact sensor 20. An electrical continuity tester is used to determine whether any of the circuits have been broken. One probe of the continuity tester is placed on point X. The second probe is then placed on points X', Y, Y', Z, Z', one at a time. If any of the two points tested show an open circuit, this is an indication that at least one of the filaments 26 has been broken and that the device has been exposed to at least the predetermined impact force.

The properties of the ball 24 and wire filaments 26 can be varied according to the desired threshold impact force and the type and purity of materials used. In the impact sensor 20, six wire filaments 26 support the ball 24 within the case 22. It is to be noted however that the impact sensor 20 can be modified such that only two wire filaments 26 support the ball 24 within the case 22. In such an embodiment, the wire filaments 26 can be thicker than those described above or shown in FIGS. 1 to 3, in order to provide sufficient support for the ball 24 in all possible directions of movement of the ball 24, but still be adapted to break when the impact sensor 20 is exposed to at least the predetermined impact force. Similarly, the impact sensor 20 can be modified such that three, four or five wire filaments 26, substantially equally spaced around the ball 24, support the ball 24 within the case 22. In these embodiments, a similar number of external wires 34 will be required to perform the electrical testing for impact exposure as described above.

Temperature Sensor

Figure 5:
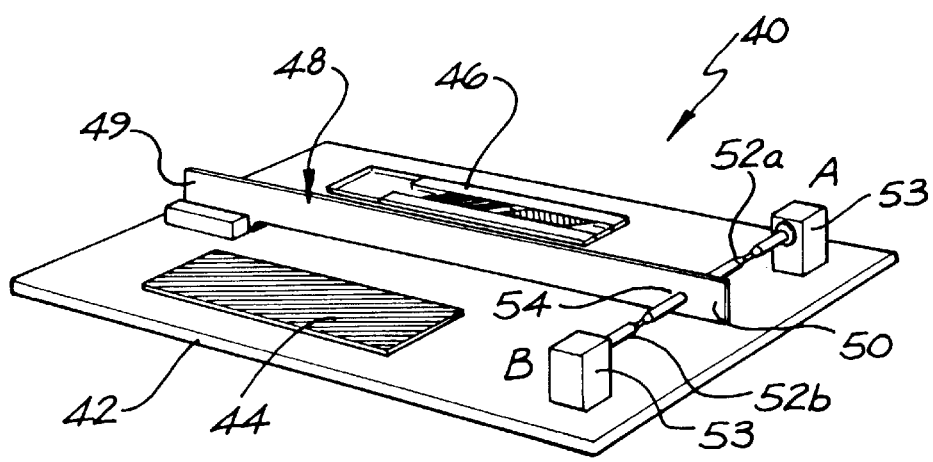
FIG. 5 is a temperature sensor module.

FIG. 5 shows a temperature sensor module 40. The temperature sensor module 40 includes a base 42, a thermochromic indicator 44, a capillary indicator 46 and a bi-metallic strip 48. The thermochromic indicator 44 and capillary indicator 46 are both laid on the base 42. A first end 49 of the bimetallic strip 48 is fixed to the base 42, while its second end 50 is attached to two wire filaments 52 (52*a*, 52*b*), which extend perpendicularly to the strip 48 on opposite sides thereof. A first end of each filament 52 is attached to formations 53 on the base 42 while their second ends 54 are attached to the strip 48 as described. The filaments 52 are made of the same material as the filaments 26 described above and are attached to the base 42 and strip 48 by ultrasonic wedge bonding.

Visual Indicator—Lower Threshold Temperature

Referring to FIG. 8, the capillary indicator 46 includes a capillary 60 with an enlarged end section 61. The capillary 60 holds two separate mixtures of colored liquids 62, 64 therein. At room temperature (see FIG. 8*a*), the colored liquids 62, 64 maintain their separation and position in the capillary 60 due to the very small diameter of the capillary 60. The small surface area of the interface between the liquids 62, 64 within the capillary 60 provides a surface tension between the liquids 62, 64 which prevents the liquids 62, 64 from mixing with each other. When the capillary indicator 46 is exposed to a temperature approaching a lower threshold temperature (see FIG. 8*b*), the colored liquids 62, 64 contract and start moving toward the end section 61 due to capillary action. When the capillary indicator 46 is exposed to the lower threshold temperature (see FIG. 8*c*), the colored liquids 62, 64 are contracted sufficiently and both move to the end section 61. At the enlarged end section 61 (see FIG. 8*d*), the enlarged volume allows the colored liquids 62, 64 to mix with each other and turn into a different coloured liquid 65.

Typically, the coloured liquid 62 will be an alcohol-based liquid having an initial colour of blue and the coloured liquid 64 will be an alcohol-based liquid having an initial colour of yellow, to provide a green colour 65 when they mix with each other. The green colour 65 will thus indicate exposure of the capillary indicator 46 to at least the lower threshold temperature.

Visual Indicator—Upper Threshold Temperature

Referring to FIG. 5, the thermochromic indicator 44 is a mixture of heat sensitive chemicals (thermochromic) which irreversibly changes color when exposed to a predetermined upper threshold temperature. If the thermochromic indicator 44 is exposed to at least the upper threshold temperature (see FIG. 7), the thermochromic indicator 44 permanently changes to a different color, to indicate such an exposure. Typically, the thermochromic indicator 44 will be made of two interspersed solid waxes having initial colours of blue and red, respectively, which mix and turn to purple after exposure to the predetermined upper threshold temperature. The thermochromic indicator 44 can alternatively be iron soaps such as that disclosed in U.S. Pat. No. 3,953,659 (assigned to Texas Instruments Incorporated) which darkens from white to dark when exposed to a certain upper threshold temperature.

Electrical and Visual Indicator—Upper and Lower Threshold Temperatures

The bimetallic strip 48 (see FIG. 5) is a thermostat metal material, made from two or more metallic layers having different coefficients of thermal expansion which are bonded together. The bonded layers cause the strip 48 to change its curvature (bend) when exposed to a change in temperature. The strip 48 will bend in one direction when exposed to lower temperatures and in the opposite direction when exposed to higher temperatures. The strip 48 used is a "snap-action" strip which is designed to bend and snap into place at the upper or lower threshold temperature. The snap-action strip is shaped such that there is some deformation and spring action in the strip to inhibit normal thermal movement of the strip until the buildup of stress in the strip (at the upper or lower threshold temperature) is sufficient to reverse the deformation, at which it snaps into a bend.

The strip 48 is oriented such that it bends sideways along the base 42, in that it can bend toward the thermochromic indicator side of the base 42 or to the capillary indicator side thereof. With the strip first end 49 fixed to the base 42, the strip second end 50 can move depending on the temperature. As the second end 50 is attached to two filaments 52*a*, 52*b* on opposite sides thereof, any of the two filaments 52*a*, 52*b* may break when the sensor 40 is exposed to the upper or lower threshold temperatures. For example, if the strip 48 is exposed to the lower threshold temperature (see FIG. 6), the strip 48 will snap into a bend toward the capillary indicator side of the board 42 sufficiently to cause the filament 52*b* to break. Conversely, if the strip 48 is exposed to the upper threshold temperature (see FIG. 7), the strip 48 will snap into a bend toward the thermochromic indicator side of the base 42 sufficiently to cause the filament 52*a* to break. The breaking of either of the filaments 52*a*, 52*b* gives a visual indication that the sensor 40 has been exposed to at least the upper or lower threshold temperatures. The temperature sensor 40 can also indicate exposure to both upper and lower threshold temperatures by breaking of both filaments 52*a*, 52*b*, via bending of the strip 48 in both directions.

A slow make/break (creep) type of strip can alternatively be used, instead of the snap-action strip. The creep type of strip bends slowly when the temperature changes and does not snap into place. In such an embodiment, the strip 48 will be configured to bend sufficiently to break the filaments 52*a*, 52*b* at the upper or lower threshold temperatures.

Figure 6:
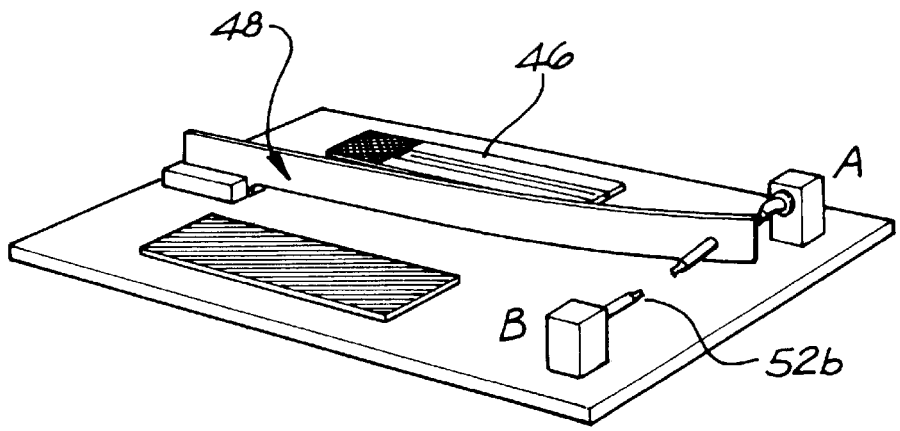
FIG. 6 is a diagram showing the temperature sensor module of FIG. 5 after exposure to a lower threshold temperature.
Figure 7:
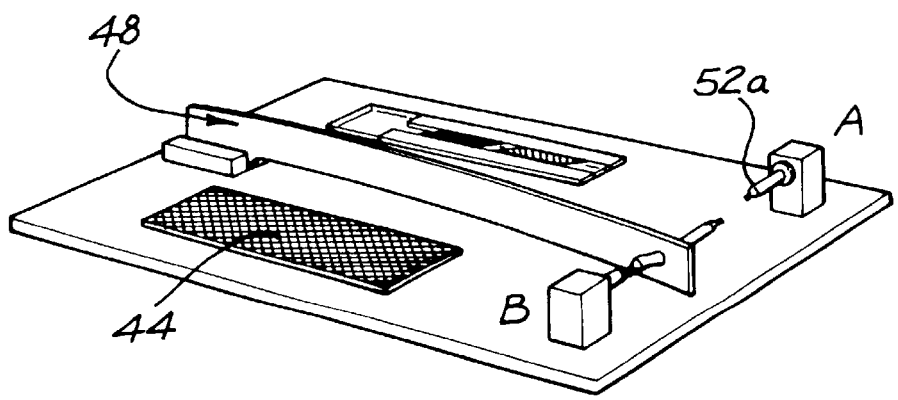
FIG. 7 is a diagram showing the temperature sensor module of FIG. 5 after exposure to an upper threshold temperature.
Figure 8A:
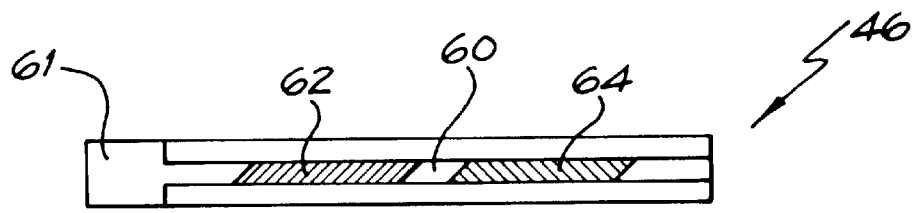
FIG. 8 is a diagram showing the capillary indicator for the temperature sensor module of FIG. 5.
Figure 8B:
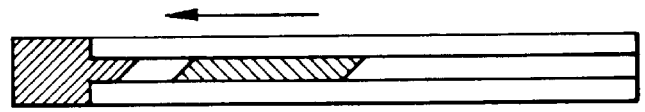
Figure 8C:
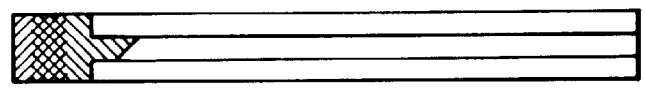
Figure 8D:
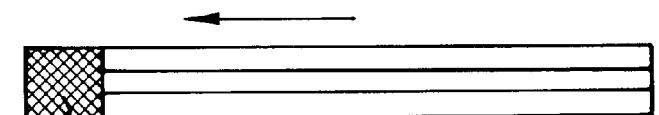
Figure 9:
FIG. 9 is a logical circuit diagram for the temperature sensor module of FIG. 5.

Determining whether one or both of the filaments 52*a*, 52*b* is broken can also be performed electrically. Referring to FIGS. 5 to 7, wires can be connected to the points A, B of the filaments 52*a*, 52*b*, which correspond to the ends of each filament 52*a*, 52*b* adjacent the base formations 53. As the filaments 52*a*, 52*b* and strip 48 are electrically conductive, the circuit between the two points A, B will be broken if one or both of the filaments 52*a*, 52*b* is broken. FIG. 9 is a logical circuit diagram for the temperature sensor 40. An electrical continuity tester is used to determine whether the circuit between points A and B has been broken. One probe of the continuity tester is placed on point A and the second probe is placed on point B. If the two points A, B show an open circuit, this is an indication that at least one of the filaments 52*a*, 52*b* has been broken and that the device has been exposed to the upper or lower threshold temperature.

If the orientation of the strip 48 is known (ie. which way it bends when exposed to low and high temperatures), then from viewing which of the filaments 52*a* or 52*b* is broken, it can be determined whether the sensor 40 was exposed to the upper or the lower threshold temperature. The base 42 can be marked in order in order to indicate the orientation of the strip 48, for example with a "+" and "−" sign, indicating the direction the strip bends to higher and lower temperatures, respectively. This can be supported by the change in colour of the capillary indicator 46 and the thermochromic indicator 44. The sensor 40 will show green (from the capillary indicator 46) if exposed to the lower threshold temperature and purple (from the thermochromic indicator 44) if exposed to the upper threshold temperature.

In the sensor 40, the filaments 52 extend perpendicularly to the strip 48. The filaments 52 can however be disposed at an acute angle to the strip 48 without adverse effects to the sensor 40. In another embodiment, a single filament 52 can be attached to the strip 48. In this embodiment, the filament 52 can extend substantially in line with the strip 48. The first end of the filament 52 can be attached to the base 42 under the strip 48 or to a side of the base 42 opposite to the strip first end 49. Thus, bending of the strip 48 in response to either the upper or lower threshold temperature will cause the filament 52 to break indicating exposure of the sensor 40 to at least one of the upper or lower threshold temperature.

The capillary indicator 46 and the thermochromic indicator 44 will be configured such that they change colour at the same lower and upper threshold temperatures as the strip 48, or vice versa. To change the temperature at which the thermochromic indicator 44 will change colour, the composition, density and ratio of the thermochromic chemicals in the indicator 44 can be changed. To change the temperature at which the liquids 62, 64 in the capillary indicator 46 will move toward the end section 61, different colored liquids with different freezing points (eg. water, alcohol) can be used. For the strip 48, the threshold temperatures can be changed by changing the thickness and/or length of the strip 48 or the metals used in the bimetallic strip 48. The metals used will vary the bending of the strip 48 in response to temperature, due to the different high and low temperature expansion properties of different metals.

Humidity Sensor

Figure 10:
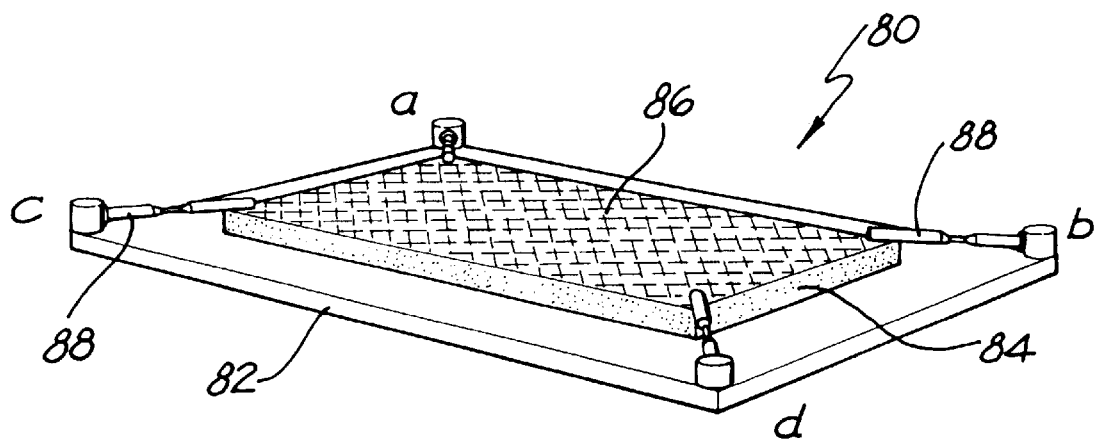
FIG. 10 is humidity sensor module.

FIG. 10 shows a humidity sensor module 80. The humidity sensor 80 includes a base 82, an absorbent plate 84 mounted on the base 82, a metallic top panel 86 on the plate 84 and four filaments 88 respectively attached between each corner of the top panel 86 and the base 82.

Visual Indicator

The plate top panel 86 is a thin electrically conductive metal panel coated with two water soluble dye particles of different colours interspersed with one another. The dye particles can be arranged in separate layers on the top panel 86 or they can be mixed with each other to form a single layer. In the absence of humidity (moisture), the dye particles maintain their separation and thus maintain an initial colour on the top panel 86. In the presence of at least a predetermined humidity level, the dye particles dissolve and mix with each other, showing a color change, indicating exposure of the humidity sensor 80 to at least the predetermined humidity level. If the plate 84 is submerged under water, the dye particles will be washed away revealing the plate top panel 86, which is of a different colour to the initial colour. This change in color will also indicate exposure of the humidity sensor 80 to at least the predetermined humidity level.

Dye particles such as food coloring agents Federal Food, Drug & Cosmetic (FD&C) Yellow #5 and FD&C Blue #2 manufactured on a salt base (eg. sodium chloride or sodium bromide) can be used to coat the top panel 86. These dye particles, from their initial colours of blue and yellow, turn into a green colour when exposed to the predetermined humidity level.

Electrical and Visual Indicator

The absorbent plate 84 increases in size when exposed to humidity. The plate 84 is blended from two polymers: (1) polyvinyl acetate which substantially maintains the original external shape and color of the plate 84 and (2) a superabsorbent material such as polyacrylamide, and a binding compound binding the polymers together. When the plate 84 is exposed to at least the predetermined humidity level, the plate 84 will expand generally upwardly (see FIG. 11) causing the filaments 88 attached between the base 82 and the top panel 86 to break, thereby indicating previous exposure to at least the predetermined humidity level.

Figure 11:
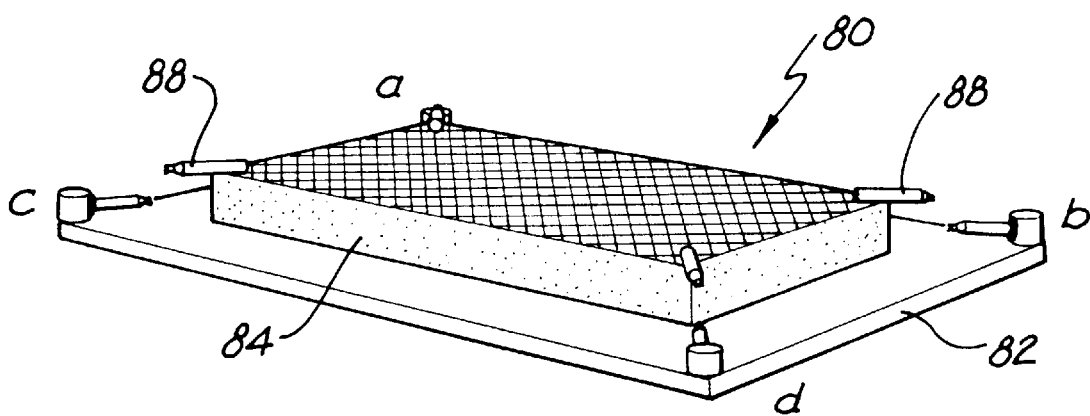
FIG. 11 is a diagram showing the humidity sensor module of FIG. 10 after exposure to wetness or high humidity.
Figure 12:
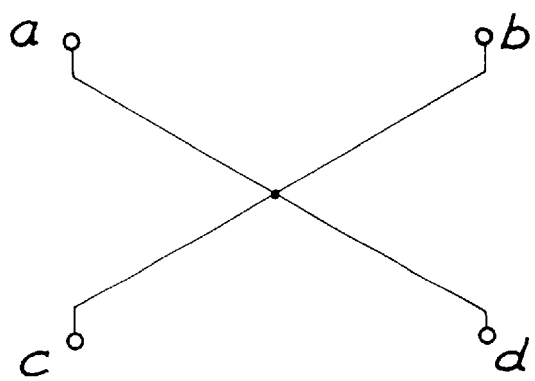
FIG. 12 is a logical circuit diagram for the humidity sensor module of FIG. 10.

Referring to FIGS. 10 and 11, wires can be connected to the points a, b, c, d of the filaments 88. Points a, b, c, d of the filaments 88 correspond to the ends of the filaments 88 adjacent the base 82. The base 82 is made from a non-conductive material. As the filaments 88 and the top panel 86 are electrically conductive, the circuit between any two of the points a, b, c, d, conducting through the top panel 86, will be broken if any of their corresponding filaments 88 is broken. FIG. 12 is a logical circuit diagram for the humidity sensor 80. An electrical continuity tester is used to determine whether any of the circuits have been broken. One probe of the continuity tester is placed on point a. The second probe is then placed on points b, c, d, one at a time. If any of the two points tested show an open circuit, this is an indication that at least one of the filaments 88 has been broken and that the device has been exposed to at least the predetermined humidity level.

Threshold humidity values in the humidity sensor 80 can be varied by changing the solubility properties and density of the dye particles as well as changing the amount, thickness and density of the superabsorbent material polyacrylamide in the plate 84. The filaments 88 used for the sensor 80 are similar to the above described filaments 26 and 52.

Integrated Impact, Temperature and Humidity Sensor

Figure 13:
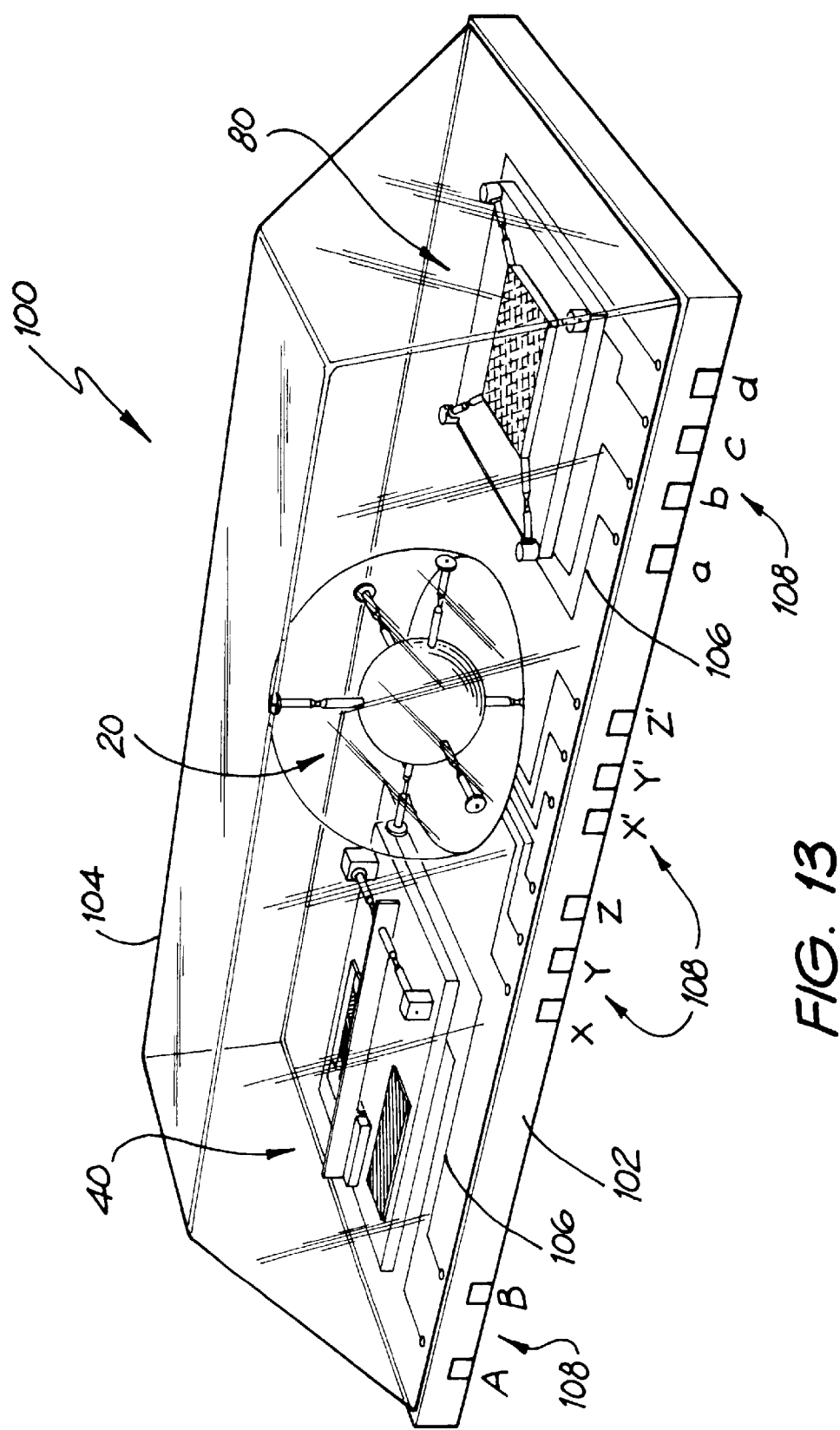
FIG. 13 is an integrated impact, temperature and humidity sensor.

FIG. 13 shows an integrated impact, temperature and humidity sensor 100. The sensor 100 includes a substrate 102, to which is attached the above described impact sensor 20, temperature sensor 40 and humidity sensor 80. A clear cover 104 which covers the sensors 20, 40 and 80 is attached to the substrate 102. The cover 104 has holes formed therein to allow outside humidity and temperature to enter the cover 104. Wires 106 respectively connect each of the filaments 26, 52 and 88 to individual exposed electrical contacts 108 disposed along the side of the substrate 102. These contacts 108 correspond to the testing points of the filaments 26, 52 and 88 described above (A, B, X, X', Y, Y', Z, Z', a, b, c, d).

In use, the sensor 100 is connected to an inside casing of an electrical device. Determining whether the device has been exposed to an impact, adverse temperature or humidity can then be performed via the contacts 108 and an electrical continuity tester, according to the methods described above. Alternatively, the contacts 108 of the sensor 100 can be attached to a circuit board of the electronic device to which the sensor 100 is fitted. This will allow the electronic device to perform occasional "self-testing" of the sensors 20, 40 and 80, to ensure that it has not been exposed to an impact, adverse temperatures or humidity.

The sensor 100 will indicate if any portable or mobile device has been exposed to adverse handling conditions or environmental conditions beyond the design specification of such products. This will allow a repairer to quickly and reliably determine exposure to such conditions and dispute/refuse false warranty claims.

The sensor 100 is also made from inexpensive materials which will allow cheap manufacture. The sensor 100 is unresettable and once exposure to adverse conditions is indicated, warranty can be voided. Providing an unresettable sensor will avoid possible attempts to reset the sensor for false warranty claims. The sensor 100 is also of a miniature size, allowing easy attachment to portable and mobile device casings.

The threshold values for the impact, temperature and humidity sensors 20, 40 and 80 may be varied depending on the sensitivity of the devices to which the sensor 100 is to be attached. For example, laptop computers which include more sensitive electronic components will have sensors with narrower impact, temperature and humidity threshold values than mobile phones, which have less sensitive electronic components.

In the sensor 100, only mechanical and chemical sensors are used to indicate exposure to adverse conditions. The advantage of mechanical and chemical sensors is that the sensor 100 does not require a power source for both operation and checking.

The sensor 100 can be checked very quickly for exposure to adverse conditions, visually or electrically by simple electronic means. Checking can thus be performed by repair and service technicians with minimal training Although preferred embodiments of the present invention have been described, it will be apparent to skilled persons that modifications can be made to the above embodiments.

I claim:

1. A device for indicating exposure to at least a predetermined impact force, the device comprising a hollow case, a mass within the case, and at least two wire filaments extending from the mass to the case for supporting the mass within the case, wherein exposure of the device to at least a predetermined impact force results in a force acting on the mass sufficient to cause at least one of the filaments to break, the breaking of at least one of the filaments indicating exposure of the device to at least the predetermined impact force.

2. The device of claim 1 wherein the case is substantially spherical.

3. The device of claim 1 wherein the mass is substantially spherical.

4. The device of claim 1 wherein the mass is supported in the middle of the case.

5. The device of claim 1 wherein each filament comprises an elongated shaft having a reduced diameter portion at a mid-section thereof.

6. The device of claim 1 wherein air is evacuated from the case such that the mass is in a vacuum.

7. The device of claim 1 wherein the case is made of high impact crystal or hard plastic and is non-ferromagnetic and non-conductive.

8. The device of claim 1 wherein the mass and the wire filaments are made from non ferromagnetic material.

9. A portable or mobile electronic equipment having the indicating device of claim 1.

10. The device of claim 1 wherein six or more wire filaments support the mass within the case.

11. The device of claim 10 wherein the six or more wire filaments are substantially equally spaced around the mass.

12. The device of claim 1 wherein six wire filaments support the mass within the case, the six wire filaments being arranged in three opposing pairs around the mass, the filaments in each pair being on opposite sides of the mass.

13. The device of claim 12 wherein a first opposing pair of the wire filaments extends in a first direction, a second opposing pair of the wire filaments extends in a second direction substantially perpendicular to the first direction, and a third opposing pair of the wire filaments extends in a third direction substantially perpendicular to the first and second directions.

14. The device of claim 12 wherein the mass and the wire filaments are made from conductive material, the device further including six external wires respectively connected to the wire filaments, each wire being respectively connected to the end of each wire filament adjacent the case, wherein an open circuit between any two of the wires indicates breaking of at least one of the filaments and that the device has been exposed to at least the predetermined impact force.

15. The device of claim 1 wherein the case is made from light-transmissive material.

16. The device of claim 15 wherein the case is made from a clear material.

17. The device of claim 1 wherein the mass and the wire filaments are made from conductive material.

18. The device of claim 17 further including one external wire respectively connected to each wire filament, each wire being respectively connected to the end of each wire filament adjacent the case, wherein an open circuit between any two of the wires indicates breaking of at least one of the filaments and that the device has been exposed to at least the predetermined impact force.

19. A device for indicating exposure to at least a predetermined upper threshold temperature or at least a predetermined lower threshold temperature, the device comprising:

a base, a bimetallic strip made of two or more metallic layers having different coefficients of thermal expansion bonded together, wherein the bonded layers cause the strip to bend when exposed to a change in temperature, the strip having a first end and a second end, the first end of the strip being fixed to the base, a wire filament having a first end attached to the strip second end and a second end attached to the base, wherein exposure of the device to at least a predetermined upper or lower threshold temperature results in a bending of the strip sufficient to cause the filament to break, the breaking of the filament indicating exposure of the device to at least the predetermined upper or lower threshold temperature.

20. The device of claim 19 further including a thermochromic indicator laid on the base, the thermochromic indicator changing color when exposed to at least the predetermined upper threshold temperature.

21. The device of claim 19 further including a capillary indicator laid on the base, the capillary indicator including a capillary with an enlarged end section, two separate mixtures of colored liquids being held in the capillary, wherein at room temperature the colored liquids maintain their separation and position in the capillary, and wherein when the capillary indicator is exposed to at least the predetermined lower threshold temperature, the colored liquids contract and move to the end section where they mix with each other and turn into a different colour liquid to indicate exposure of the capillary indicator to at least the predetermined lower threshold temperature.

22. The device of claim 19 wherein the bimetallic strip snaps into a bend at the upper or lower threshold temperature.

23. A device for indicating exposure to at least a predetermined upper threshold temperature and/or at least a predetermined lower threshold temperature, the device comprising:

a base, a bimetallic strip made of two or more metallic layers having different coefficients of thermal expansion bonded together, wherein the bonded layers cause the strip to bend when exposed to a change in temperature, the strip having a first end and a second end, the first end of the strip being fixed to the base, the strip second end moving in a first direction when the strip bends upon exposure to a lower temperature and in a second direction generally opposite the first direction when the strip bends upon exposure to a higher temperature, two wire filaments attached to the strip second end, the first wire filament generally extending along the first direction and the second wire filament generally extending along the second direction, the first end of each filament being attached to the strip second end and the second end of each filament being attached to the base, wherein exposure of the device to at least a predetermined lower threshold temperature results in a bending of the strip sufficient to cause the second filament to break, and exposure of the device to at least a predetermined upper threshold temperature results in a bending of the strip sufficient to cause the first filament to break, the breaking of at least one the filaments indicating exposure of the device to at least the predetermined upper or lower threshold temperature.

24. The device of claim 23 wherein the filaments extend substantially perpendicularly to the strip.

25. The device of claim 23 further including a thermochromic indicator laid on the base, the thermochromic indicator changing color when exposed to at least the predetermined upper threshold temperature.

26. The device of claim 23 further including a capillary indicator laid on the base, the capillary indicator including a capillary with an enlarged end section, two separate mixtures of colored liquids being held in the capillary, wherein at room temperature the colored liquids maintain their separation and position in the capillary, and wherein when the capillary indicator is exposed to at least the predetermined lower threshold temperature, the colored liquids contract and move to the end section where they mix with each other and turn into a different colour liquid to indicate exposure of the capillary indicator to at least the predetermined lower threshold temperature.

27. The device of claim 23 wherein the bimetallic strip snaps into a bend at the upper or lower threshold temperature.

28. A portable or mobile electronic equipment having the indicating device of claim 23.

29. The device of claim 23 wherein the strip and the wire filaments are made from a conductive material.

30. The device of claim 29 further including two external wires respectively connected to the wire filaments, each wire being respectively connected to the end of each wire filament adjacent the base, wherein an open circuit between the two wires indicates breaking of at least one of the filaments and that the device has been exposed to at least the predetermined upper or lower threshold temperature.

31. A device for indicating exposure to at least a predetermined humidity level, the device comprising a base, an absorbent plate mounted on the base which expands when exposed to moisture, and at least one filament, a first end of each filament being attached to the base and a second end of each filament being attached to the plate at a position elevated from the base, wherein exposure of the device to at least a predetermined humidity level results in expansion of the plate sufficient to cause the at least one filament to break, the breaking of the at least one filament indicating exposure of the device to at least the predetermined humidity level.

32. The device of claim 31 wherein two filaments are attached between the base and the plate.

33. The device of claim 31 wherein the plate is rectangular and the device includes four filaments extending between each top corner of the plate and the base.

34. The device of claim 31 wherein the plate includes a rectangular metallic top panel and four filaments are respectively attached between the base and the corners of the top panel, the device further including four external wires respectively connected to the wire filaments, each wire being respectively connected to the end of each wire filament adjacent the base, wherein an open circuit between the any two of the wires indicates breaking of at least one of the filaments and that the device has been exposed to at least the predetermined humidity level.

35. The device of claim 31 wherein the plate has a top surface covered with two water soluble dye particles of different colours interspersed with one another, wherein in the presence of at least the predetermined humidity level, the dye particles dissolve and mix with each other, showing a color change, indicating exposure of the device to at least the predetermined humidity level.

36. A portable or mobile electronic equipment having the indicating device of claim 31.

37. The device of claim 31 wherein the plate is made from a first polymer which substantially maintains the original shape and color of the plate and a second superabsorbent polymer, and a binding compound binding the polymers together.

38. The device of claim 37 wherein the first polymer is polyvinyl acetate and the second polymer is polyacrylamide.

39. The device of claim 31 wherein the plate includes a metallic top panel and two filaments are attached between the base and the top panel.

40. The device of claim 39 further including two external wires respectively connected to the wire filaments, each wire being respectively connected to the end of each wire filament adjacent the base, wherein an open circuit between the two wires indicates breaking of at least one of the filaments and that the device has been exposed to at least the predetermined humidity level.

41. A device for indicating exposure to at least a predetermined impact force, at least a predetermined upper and/or lower threshold temperature and at least a predetermined humidity level, the device including:

(1) an impact sensor for indicating exposure to at least a predetermined impact force, the impact sensor comprising a hollow case, a mass within the case, and at least two wire filaments extending from the mass to the case for supporting the mass within the case, wherein exposure of the device to at least a predetermined impact force results in a force acting on the mass sufficient to cause at least one of the filaments to break, the breaking of at least one of the filaments indicating exposure of the device to at least the predetermined impact force;

(2) a temperature sensor for indicating exposure to at least a redetermined upper threshold temperature and/or at least a predetermined lower threshold temperature, the temperature sensor comprising a base, a bimetallic strip made of two or more metallic layers having different coefficients of thermal expansion bonded together, wherein the bonded layers cause the strip to bend when exposed to a change in temperature, the strip having a first end and a second end, the first end of the strip being fixed to the base, the strip second end moving in a first direction when the strip bends upon exposure to a lower temperature and in a second direction generally opposite the first direction when the strip bends upon exposure to a higher temperature, two wire filaments attached to the strip second end, the first wire filament generally extending along the first direction and the second wire filament generally extending along the second direction, the first end of each filament being attached to the strip second end and the second end of each filament being attached to the base, wherein exposure of the device to at least a predetermined lower threshold temperature results in a bending of the strip sufficient to cause the second filament to break, and exposure of the device to at least a predetermined upper threshold temperature results in a bending of the strip sufficient to cause the first filament to break, the breaking of at least one the filaments indicating exposure of the device to at least the predetermined upper or lower threshold temperature;

(3) a humidity sensor device for indicating exposure to at least a predetermined humidity level, the humidity sensor comprising a base, an absorbent plate mounted on the base which expands when exposed to moisture, and at least one filament, a first end of each filament being attached to the base and a second end of each filament being attached to the plate at a position elevated from the base, wherein exposure of the device to at least a predetermined humidity level results in expansion of the plate sufficient to cause the at least one filament to break, the breaking of the at least one filament indicating exposure of the device to at least the predetermined humidity level.

42. A portable or mobile electronic equipment having the indicating device of claim 41.

43. The device of claim 41 wherein the impact sensor further includes one external wire respectively connected to each wire filament, each wire being respectively connected to the end of each wire filament adjacent the case, wherein an open circuit between any two of the wires indicates breaking of at least one of the filaments and that the device has been exposed to at least the predetermined impact force;

the temperature sensor further includes two external wires respectively connected to the wire filaments, each wire being respectively connected to the end of each wire filament adjacent the base, wherein an open circuit between the two wires indicates breaking of at least one of the filaments and that the device has been exposed to at least the predetermined upper or lower threshold temperature; and the humidity sensor further includes a metallic top panel on the plate and two filaments attached between the base and the top panel, the sensor includes two external wires respectively connected to the wire filaments, each wire being respectively connected to the end of each wire filament adjacent the base, wherein an open circuit between the two wires indicates breaking of at least one of the filaments and that the device has been exposed to at least the predetermined humidity level.

44. The device of claim 43 wherein the sensors are mounted on a substrate, and the wires are respectively connected to individual electrical contacts on the substrate, wherein an open circuit between any two of the contacts for each sensor indicates breaking of at least one of the filaments of that sensor and that the device has been exposed to at least one of the predetermined impact force, the predetermined upper and/or lower threshold temperature and the predetermined humidity level.

45. The device of claim 44 further including a clear cover attached to the substrate, the cover covering the sensors and having holes formed therein to allow outside humidity and temperature to enter the cover.

\* \* \* \* \*